United States Patent
Ruel et al.

(10) Patent No.: US 6,752,454 B2
(45) Date of Patent: Jun. 22, 2004

(54) VEHICLE SEAT

(75) Inventors: Laurent Ruel, Blainville Chevron (FR); Dominique Dufaut, Esbly (FR)

(73) Assignee: Autoliv Development AB, Vargarda (SE)

( * ) Notice: Subject to any disclaimer, the term of this patent is extended or adjusted under 35 U.S.C. 154(b) by 4 days.

(21) Appl. No.: 10/168,505

(22) PCT Filed: Dec. 20, 2000

(86) PCT No.: PCT/SE00/02588

§ 371 (c)(1),
(2), (4) Date: Jun. 21, 2002

(87) PCT Pub. No.: WO01/45978

PCT Pub. Date: Jun. 28, 2001

(65) Prior Publication Data

US 2002/0190548 A1 Dec. 19, 2002

(30) Foreign Application Priority Data

Dec. 21, 1999 (GB) .............................. 9930187

(51) Int. Cl.⁷ .................................................. B60N 2/42
(52) U.S. Cl. ............................... 297/216.1; 297/284.11; 297/452.41; 297/487
(58) Field of Search .......................... 297/216.1, 284.11, 297/452.41, 487

(56) References Cited

U.S. PATENT DOCUMENTS

| | | | |
|---|---|---|---|
| 4,555,140 A | * | 11/1985 | Nemoto |
| 4,623,192 A | * | 11/1986 | Koide et al. |
| 4,629,248 A | * | 12/1986 | Mawbey |
| 5,752,717 A |   | 5/1998 | Galbraith et al. |
| 6,386,633 B1 | * | 5/2002 | Newton |
| 6,402,237 B1 | * | 6/2002 | Adomeit et al. |

FOREIGN PATENT DOCUMENTS

| | | | |
|---|---|---|---|
| FR | 2572034 | * | 4/1986 |
| GB | 2290505 A |   | 1/1996 |
| GB | 2323336 A |   | 9/1998 |
| GB | 2332884 A |   | 7/1999 |
| JP | 61-36029 | * | 2/1986 |
| WO | WO 98/41426 |   | 9/1998 |

* cited by examiner

Primary Examiner—Laurie K. Cranmer

(57) ABSTRACT

A vehicle seat has a back-rest (1) and a squab (2), a transverse beam (3) provided at the front of the squab is provided with a chamber (13), at least part of one wall being constituted by a plastically deformable metal sheet (12). The chamber is associated with a gas generator adapted to inflate the chamber (13) with an associated plastic deformation of the sheet. The inflated chamber minimizes the risk of an occupant of the seat "submarining" beneath a safety belt.

17 Claims, 4 Drawing Sheets

VEHICLE SEAT

Figure 1:
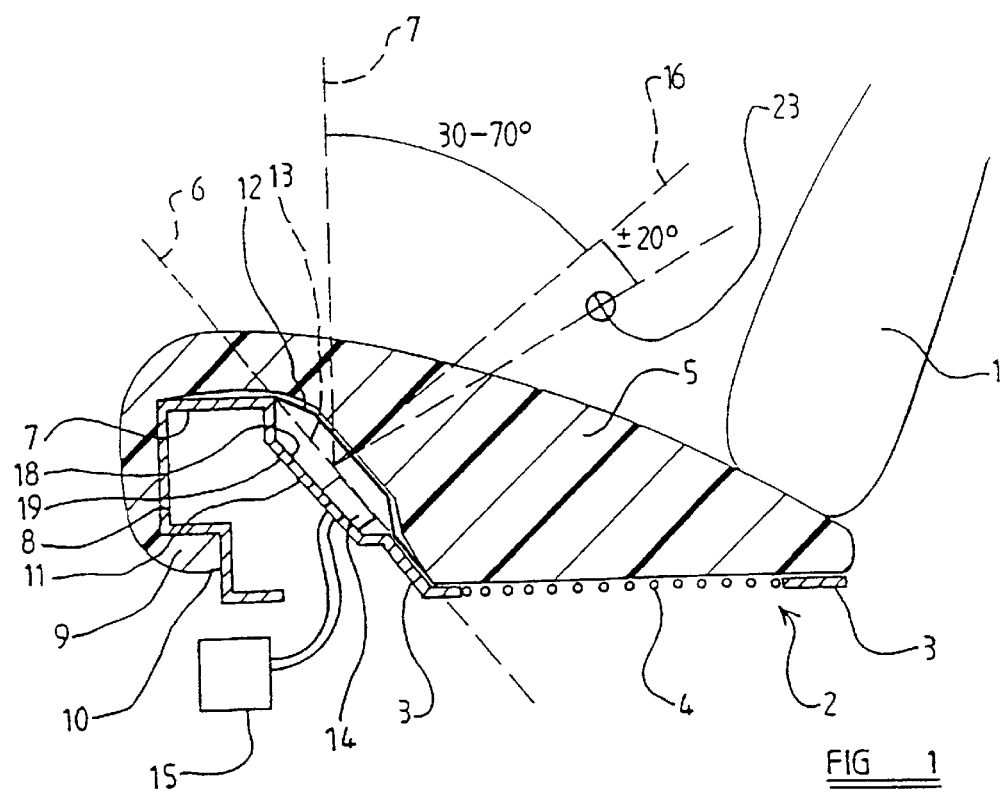

The present invention relates to a vehicle seat, and more particularly relates to a vehicle seat for use in a vehicle such as a motor car or automobile.

It is well known that if a motor vehicle is involved in a frontal impact, it is desirable that an occupant of the vehicle should be prevented from moving forwardly relative to the vehicle as the vehicle decelerates. It has been proposed, therefore, to provide a safety-belt in a vehicle which incorporates a lap belt which engages the hip bone of the occupant of the vehicle and, in the event that a front impact should occur, prevents the occupant of the vehicle from moving forwardly by any substantial distance relative to the seat.

It has been found, however, that there may be a tendency for an occupant of the seat to slide under the lap belt, when the vehicle decelerates, with a movement that is sometimes termed "submarining". This is undesirable.

Various solutions to the problem of "submarining" have been proposed. It has been suggested that a rigid barrier should be provided extending transversely in the front part of the seat squab. The lower part of the pelvis, or the ischial tuberosities, of the occupant of the seat will engage the rigid barrier if the occupant of the seat starts a "submarining" movement. It is, however, undesirable to have a rigid barrier in the front part of a seat squab, since this may give rise to blood circulation problems in the legs of an occupant of the seat. Alternatively it has been proposed, see GB-A-2,332,844, to provide an inflatable air-bag in the front part of the seat squab adapted to be inflated in the event of a frontal impact to restrict any "submarining" motion of the occupant of the seat.

A motion restricting device of this type should act on the front lower part of the pelvis, which can withstand relatively high forces. However, the available surface area presented by the pelvis in this region is very small. Thus the contact surface of the bag should be very stiff, or bag pressure should be very high, for example, of the order of 3 to 5 bars. A textile air-bag can normally only withstand a pressure of less than 2 bars, and the surface of such an air-bag is not stiff. Thus, an air-bag of the type shown in GB-A-2,332,884 does not provide the desired effect in practice.

The present invention seeks to provide an improved vehicle seat.

According to this invention there is provided a vehicle seat, the seat comprising a back-rest and a squab, the squab being provided with a chamber defined by walls of metal, at least part of one wall being constituted by a plastically deformable sheet metal, the chamber being partly bounded by or supported by part of a rigid frame constituting part of the structure of the squab of the seat, the chamber being associated with gas generator means adapted to inflate the chamber, with an associated plastic deformation of said sheet, in response to a signal from a detector.

Preferably the chamber is located substantially centrally of the squab of the seat in a lateral direction.

Conveniently part of the chamber is bounded by part of the frame structure of the squab of the seat.

Advantageously the part of the frame structure of the squab of the seat bounding or supporting the chamber defines a plane termed the supporting plane, a line normal to the supporting plane being at an angle of between 30 and 70° to the vertical.

Preferably a line between the centre of the chamber and the H-point of the seat, that is the theoretical average position of the hip of an occupant of the seat, at an angle relative to the normal to the supporting plane at the centre of the chamber of ±20°.

Conveniently the chamber is on a laterally extending beam located in the forward part of the squab constituting part of the rigid frame structure of the squab of the seat.

Preferably the gas generator comprises a pyrotechnic gas generator located within the chamber.

Advantageously the chamber is provided with one or more vent holes.

Preferably the or each vent hole passes through the part of the rigid frame structure of the seat squab bounding or supporting the chamber.

Advantageously the or each vent hole is initially closed by a rupturable foil.

Conveniently the seat squab has a foam layer above the chamber and the rest of the frame structure.

Preferably at least part of the plastically deformable sheet is corrugated.

Conveniently at least a central part of the plastically deformable sheet is reinforced.

In one embodiment the chamber is bounded by a single sheet of plastically deformable sheet metal which is secured to said rigid frame to define the chamber.

Conveniently the gas generator is on the exterior of the chamber.

In another embodiment the chamber is defined by two adjacent metal sheets, adjacent overlying edge regions of the sheets being joined by rolling or folding the edges inwardly towards the centre of the chamber by at least substantially 180°.

Preferably the edge of one sheet is initially folded by substantially 180° about the edge of the other sheet, said one sheet thus being folded by at least substantially 360°, and the other sheet being folded by at least substantially 180°.

Conveniently the gas generator is within the chamber.

Figure 2:
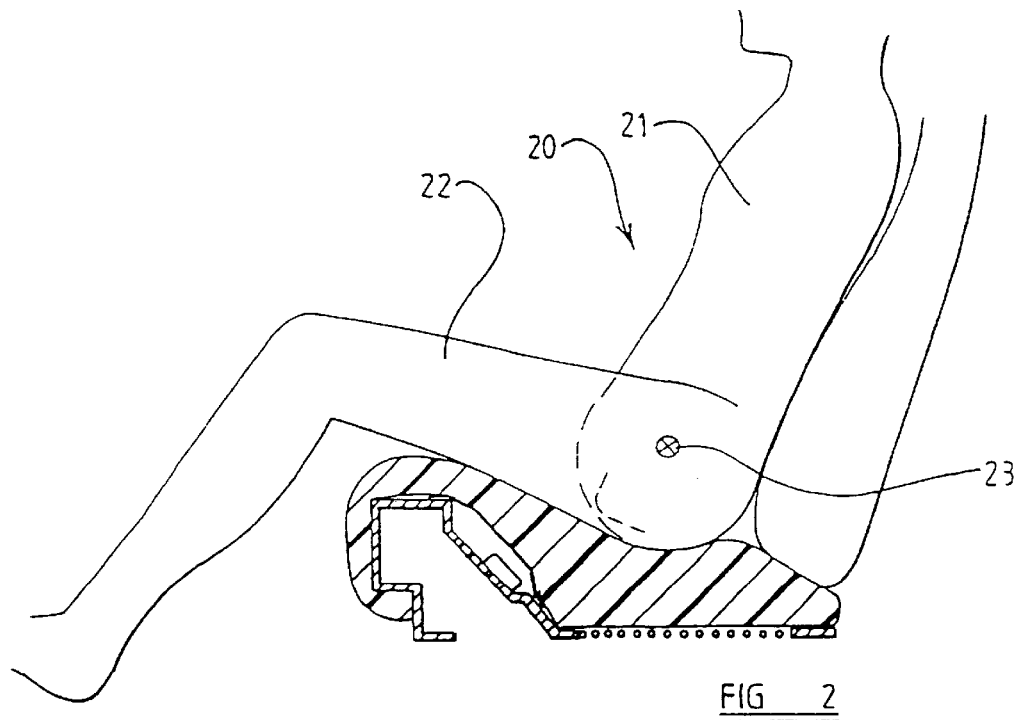
Figure 3:
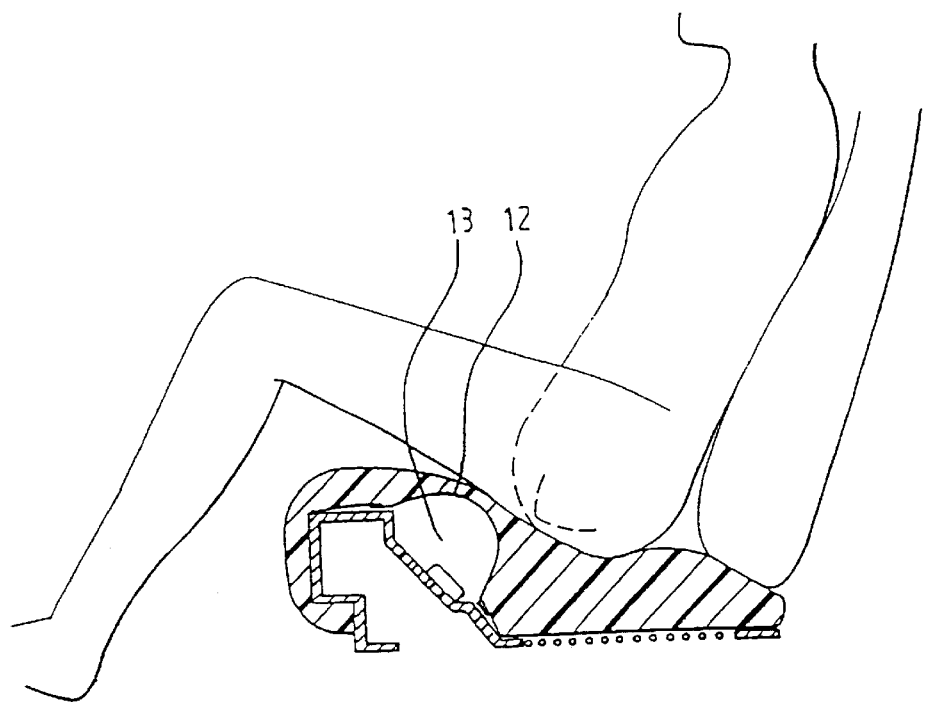
Figure 4:
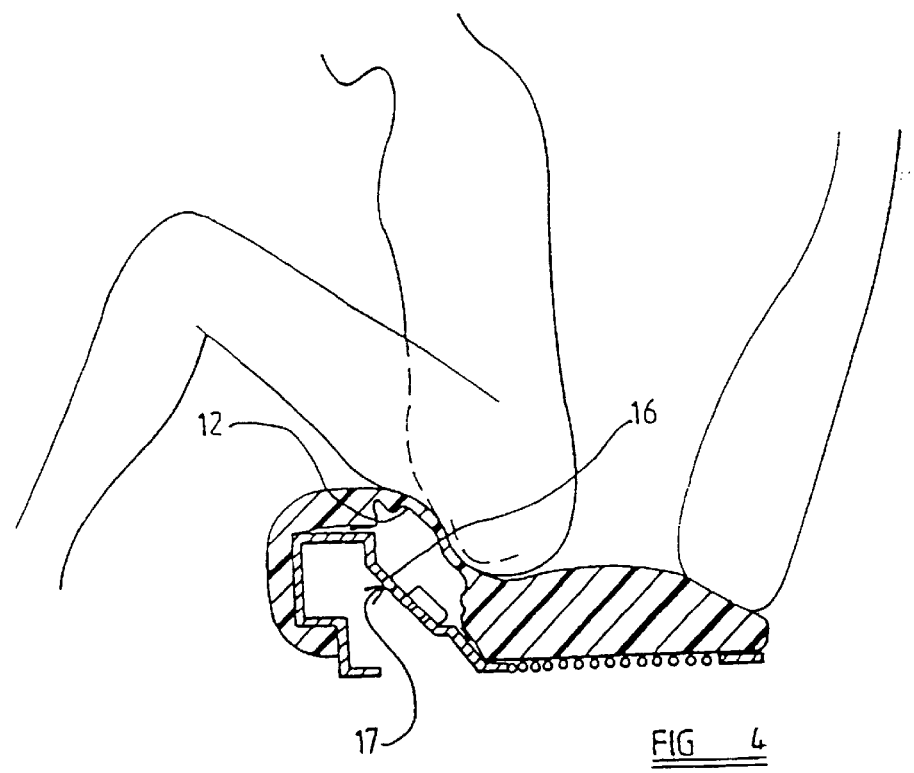
Figure 5:
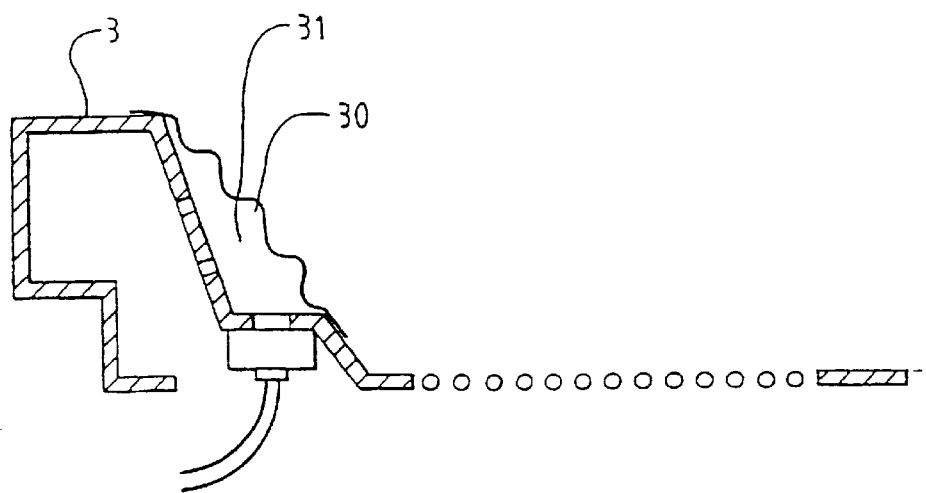
Figure 6:
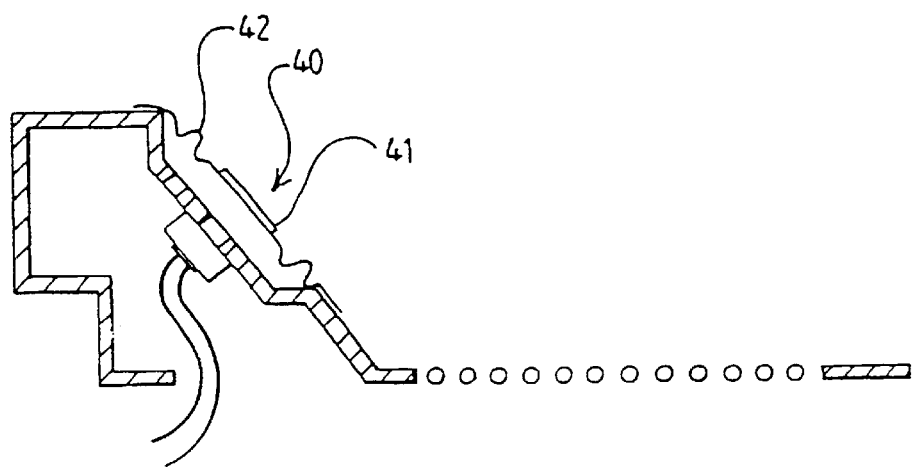
Figure 7:
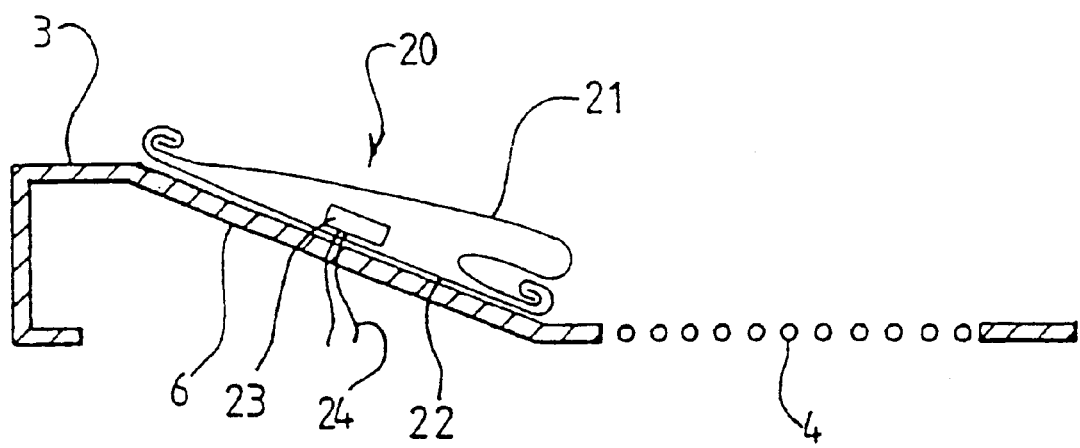
Figure 8:
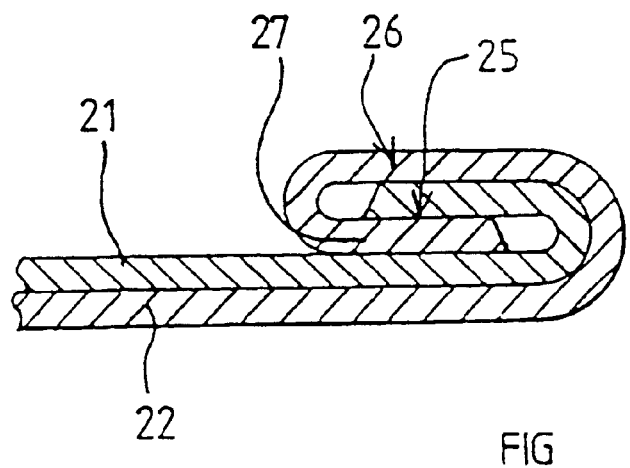

In order that the invention may be more readily understood, and so that further features thereof may be appreciated, the invention will now be described, by way of example, with reference to the accompanying drawings in which:

FIG. 1 is a diagrammatic cross-sectional view of a vehicle seat in accordance with the invention, FIG. 2 is a view corresponding to FIG. 1 additionally illustrating the occupant of the seat, FIG. 3 is a view corresponding to FIG. 2 showing the situation that exists immediately following detection of a frontal impact, FIG. 4 is a view corresponding to FIG. 3 showing the situation a few milliseconds later, FIG. 5 is a diagrammatic sectional view illustrating a modified embodiment of the invention, FIG. 6 is a diagrammatic view corresponding to FIG. 5 illustrating yet another modified embodiment of the invention, FIG. 7 is a diagrammatic cross-sectional view corresponding to FIG. 5 illustrating a further modified embodiment of the invention, and FIG. 8 is an enlarged view of part of the embodiment shown in FIG. 7.

Referring initially to FIG. 1 of the accompanying drawings, a vehicle seat comprises a back-rest 1 and a squab 2. The squab 2 comprises an underlying frame structure 3 formed of metal, part of the frame structure carrying a generally horizontal resilient net or spring structure 4. Mounted on top of the frame structure 3 and the net or spring structure 4 is a padded cushion 5 which may be formed of foam or the like.

The front part of the frame structure 3 comprises a generally inclined wall, defining a plane 6, herein referred to as the supporting plane. The portion of the frame defining the supporting plane 6 terminates with a horizontally extending portion carrying a depending lip 8 carrying rearwardly and downwardly directed flanges 9, 10 respectively. The foam 5 surrounds all of the above described parts of the frame structure 3 of the squab 2 of the seat.

Centrally located, in a direction extending transversely of the seat, in the part of the lateral beam that defines the supporting plane 6, is a recess 11. The recess 11 is covered by a plastically deformable sheet of metal 12, thus defining a chamber 13. The chamber 13 may have a very small initial size. Contained within the chamber 13 is a gas generator 14, the gas generator 14 being associated with a sensor 15 adapted to sense a frontal impact or substantial deceleration. The gas generator 14 is adapted to be activated in response to a signal from the sensor 15.

The perpendicular line 16 to the supporting plane extends towards the rear of the vehicle and makes an angle of between 30° and 70° with the vertical 17.

At least one aperture 18 is formed in the base of the recess 11 formed in the lateral beam that defines the supporting plane 6, that aperture 18 initially being covered by a rupturable foil 19, such as a foil of aluminium or the like.

FIG. 2 corresponds with FIG. 1 and illustrates an occupant 20 sitting on the seat. The occupant has a torso 21 and legs 22. The so-called "H" point 23 of the occupant is indicated, this being the position occupied by the theoretical average or typical pivot axis constituted by the hip of the occupant, that is to say the pivot axis between the torso 21 of the occupant 20 and the leg 22 of the occupant 20. As can be seen from FIG. 1, a line from the "H" point 23 to a point substantially central within the chamber 13 should make an angle of ±20° with the normal 16 to the supporting plane 6.

It is to be appreciated that in response to a signal from the sensor 15, the gas generator 14 will generate gas, and thus the chamber 13 will become inflated, thus distending and plastically deforming the layer of metal 12 initially covering the recess 11, so that the chamber 13 is distended, as shown in FIG. 3, with the wall 12 of the chamber thus presenting a barrier in front of the pelvis of the occupant of the seat. The barrier is a relatively still barrier, since it is constituted by the layer of metal 12, but the barrier is such that, if subjected to a very high force, the metal may again plastically deform. Thus, if the occupant of the seat is thrown forwardly in the manner illustrated in FIG. 4, the metal 12 may yield, absorbing energy from the occupant of the seat and thus further compressing any gas remaining within the chamber 13. In such a situation the metal foil 19 covering the aperture 18 may rupture enabling the aperture 18 to function as a vent hole.

FIG. 5 illustrates a modified embodiment of the invention in which a corrugated plastically deformable metal layer 30 is provided to define, in combination with the seat frame 5, a chamber 31. The corrugation enables the chamber 31 to have a relatively large volume when inflated, even though the chamber may have a relatively small volume when uninflated.

FIG. 6 illustrates a further modified embodiment in which a plastically deformable metal layer 40 is provided to define the chamber. The metal layer 40 has a central, relatively strong reinforced region 41, surrounded by a corrugated region 42. In use of the embodiment of FIG. 6, a relatively large chamber may be created when the gas generator is actuated, but the central region of the metal of that chamber, that is to say the region located to be impacted by the pelvis of the occupant of the seat, will be reinforced.

FIG. 7 illustrates a further modified embodiment of the invention. In this embodiment of the invention the frame structure 3 of a vehicle seat comprises an inclined wall defining a plane 6, referred to as the supporting plane, of the type described above. The supporting plane 6 carries an element 20 which comprises two super-imposed sheets 21, 22 of metal, at least the upper sheet, sheet 21 being plastically deformable.

A gas generator 23 is provided which is located between the two sheets, thus being within a chamber which is defined by the sheets. Electric leads 24 are associated with the gas generator 23 to supply a signal to the gas generator to initiate action of the gas generator.

Referring now to FIG. 8, the edge regions of the upper sheet 21 and the lower sheet 22 are shown. It is to be appreciated that the edge region 25 of the upper sheet 21 initially overlies the edge region 26 of the lower sheet 22, with a portion 27 of the edge region 26 of the lower sheet 22 projecting beyond the edge of the sheet 21. This portion 27 is initially rolled or folded inwardly towards the centre of the sheet by approximately 180° so that the edge region 26 of the lower sheet 22 thus embraces the actual edge of the upper sheet 21. The combination of the two sheets is then folded again by approximately 180°, again being folded inwardly towards the centre of the sheet, so that the portion 27 of the lower sheet 22 is brought into contact with the upper surface of the upper sheet 21. Thus a substantially gas-tight seal is provided in the overlying edge regions of the upper and lower sheet 22. A final stamping or crimping step may be effected so that the component parts of the described seal are firmly clamped together.

In the present specification "comprise" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A vehicle seat, the seat comprising a back-rest and a squab, the squab being provided with a chamber defined by walls of metal, at least part of one wall being constituted by plastically deformable sheet metal, the chamber being partly bounded by or supported by part of a rigid frame constituting part of the structure of the squab of the seat, the chamber being associated with gas generator means adapted to inflate the chamber, with an associated plastic deformation of said sheet metal, in response to a signal from a detector, wherein the gas generator means comprises a pyrotechnic gas generator located within the chamber.

2. A seat according to claim 1 wherein the chamber is located substantially centrally of the squab of the seat in a lateral direction.

3. A seat according to claim 1 wherein part of the chamber is bounded by part of the frame structure of the squab of the seat.

4. A seat according to claim 1 wherein the part of the frame structure of the squab of the seat bounding or supporting the chamber defines a plane termed the supporting plane, a line normal to the supporting plane being at an angle of between 30 and 70° to the vertical.

5. A seat according to claim 4 wherein a line between the center of the chamber and the H-point of the seat, that is the theoretical average position of the hip of an occupant of the seat, is at an angle relative to the normal to the supporting plane at the center of the chamber of ±20°.

6. A seat according to claim 1 wherein the chamber is on a laterally extending beam located in the forward part of the squab constituting part of the rigid frame structure of the squab of the seat.

7. A seat according to claim 1 wherein the seat squab has a foam layer above the chamber and the rest of the frame structure.

8. A seat according to claim 1 wherein at least part of the plastically deformable sheet metal is corrugated.

9. A vehicle seat, the seat comprising a back-rest and a squab, the squab being provided with a chamber defined by walls of metal, at least part of one wall being constituted by plastically deformable sheet metal, the chamber being partly bounded by or supported by part of a rigid frame constituting part of the structure of the squab of the seat, the chamber being associated with gas generator means adapted to inflate the chamber, with an associated plastic deformation of said sheet metal, in response to a signal from a detector, wherein the chamber is provided with one or more vent holes.

10. A seat according to claim 9 wherein the or each vent hole passes through the part of the rigid frame structure of the seat squab bounding or supporting the chamber.

11. A seat according to claim 9 wherein the or each vent hole is initially closed by a rupturable foil.

12. A vehicle seat, the seat comprising a back-rest and a spuab, the squab being provided with a chamber defined by walls of metal, at least part of one wall being constituted by plastically deformable sheet metal, the chamber being partly bounded by or supported by part of a rigid frame constituting part of the structure of the squab of the seat, the chamber being associated with gas generator means adapted to inflate the chamber, with an associated plastic deformation of said sheet metal, in response to a signal from a detector, wherein at least a central part of the plastically deformable sheet metal is reinforced.

13. A vehicle seat, the seat comprising a back-rest and a squab, the squab being provided with a chamber defined by walls of metal, at least part of one wall being constituted by plastically deformable sheet metal, the chamber being partly bounded by or supported by part of a rigid frame constituting part of the structure of the squab of the seat, the chamber being associated with gas generator means adapted to inflate the chamber, with an associated plastic deformation of said sheet metal, in response to a signal from a detector, wherein the chamber is bounded by a single sheet of plastically deformable sheet metal which is secured to said rigid frame to define the chamber.

14. A seat according to claim 13 wherein the gas generator means is on the exterior of the chamber.

15. A seat according to claim 13 wherein the gas generator means is within the chamber.

16. A vehicle seat, the seat comprising a back-rest and a squab, the squab being provided with a chamber defined by walls of metal, at least part of one wall being constituted by plastically deformable sheet metal, the chamber being partly bounded by or supported by part of a rigid frame constituting part of the structure of the squab of the seat, the chamber being associated with gas generator means adapted to inflate the chamber, with an associated plastic deformation of said sheet metal, in response to a signal from a detector, wherein the chamber is defined by two adjacent metal sheets, adjacent overlying edge regions of the sheets being joined by rolling or folding the edges inwardly towards the centre of the chamber by at least substantially 180°.

17. A seat according to claim 16 wherein the edge of one sheet is initially folded by substantially 180° about the edge of the other sheet, said one sheet thus being folded by at least substantially 360°, and the other sheet being folded by at least substantially 180°.

* * * * *